United States Patent [19]

Kloots

[11] Patent Number: 4,653,848

[45] Date of Patent: Mar. 31, 1987

[54] FIBEROPTIC CABLES WITH ANGLED CONNECTORS

[76] Inventor: Jacobus Kloots, 28 Wells Park Rd., Sturbridge, Mass. 01566

[21] Appl. No.: 733,907

[22] Filed: May 14, 1985

Related U.S. Application Data

[63] Continuation-in-part of Ser. No. 507,062, Jun. 23, 1983.

[51] Int. Cl.⁴ .................................................. G02B 6/40
[52] U.S. Cl. ................................. 350/96.22; 350/96.20
[58] Field of Search ............... 350/96.20, 96.21, 96.22, 350/96.23, 96.26

[56] References Cited

U.S. PATENT DOCUMENTS

| | | | |
|---|---|---|---|
| 4,082,422 | 4/1978 | Kloots | 350/96.23 |
| 4,124,271 | 11/1978 | Green | 350/96.22 |
| 4,193,661 | 3/1980 | d'Auria et al. | 350/96.22 |
| 4,317,615 | 3/1982 | Herold | 350/96.23 |
| 4,466,009 | 8/1984 | Konishi et al. | 350/96.21 |
| 4,494,822 | 1/1985 | Harvey | 350/96.21 |
| 4,496,215 | 1/1985 | Shaheen et al. | 350/96.23 |

*Primary Examiner*—William L. Sikes
*Assistant Examiner*—Frank González
*Attorney, Agent, or Firm*—Thomas N. Tarrant

[57] ABSTRACT

Disclosed are fiberoptic cables with angled coupling adapters such that the finished face of the terminal connector has an axis offset from that of the primary terminal assembly.

7 Claims, 5 Drawing Figures

FIBEROPTIC CABLES WITH ANGLED CONNECTORS

RELATION TO OTHER PATENT APPLICATIONS

The present application is a continuation-in-part of prior copending application Ser. No. 507,062 of myself and John Marengo filed June 23, 1983 entitled FIBEROPTIC CABLE ASSEMBLIES assigned to the same assignee.

BACKGROUND OF THE INVENTION

1. Field of the Invention

The present invention relates to fiberoptic cable assemblies and in particular relates to such assemblies with angle adapters.

2. Description of the Prior Art

Fiberoptic cable assemblies contain long bundles of brittle glass fibers. Terminal assemblies normally include long sophisticated strain relievers to prevent sharp bends near the connection point. With cable assemblies made in this fashion, cables are frequently connected to equipment with an inconvenient, bulky loop.

In the usual assembly of fiberoptic cables, the individual optical fibers are loose in the bundle to allow maximum flexibility. The fibers are cemented together only at the final terminal fitting. A sharp bend in the fibers immediately prior to the point at which they are cemented together would increase the failure rate due to fiber breakage.

SUMMARY OF THE INVENTION

In accordance with the invention a fiberoptic cable assembly is provided having a length of multiple optical fibers, a flexible sheath enclosing said fibers and a connector at each end with the connector at at least one end having the following combination:

A coupling element, enclosing the optical fibers, having a sleeve portion over which a sheath for the optical fibers is secured and an enlarged portion having internal coupling means;

A coupling adapter secured to said coupling element by said internal coupling means and having a passage enclosing the optical fibers with said passage having an exit axis at an angle of up to 90° from the passage axis of said coupling element; and, A final connector element secured to said coupling adapter and within which said optical fibers are cemented together and polished to provide and input/output interface, said optical fibers being cemented firmly on both sides of said coupling adapter to prevent flexure within the coupling adapter.

Further objects and features of the invention will become apparent upon reading the following description together with the Drawing.

DESCRIPTION OF THE PREFERRED EMBODIMENTS

Figure 1:
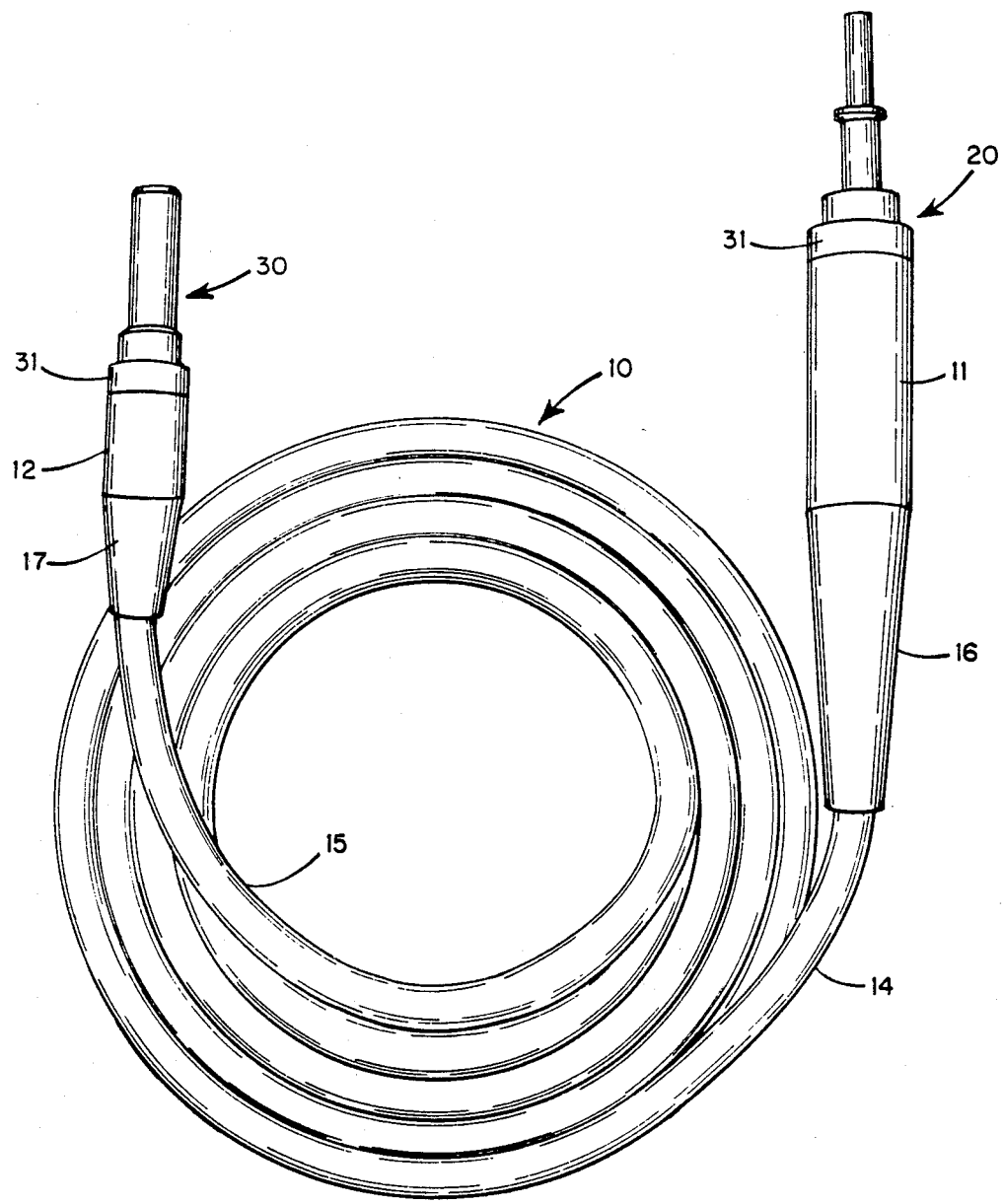
FIG. 1 is a projection of a fiberoptic cable assembly.

A fiberoptic cable assembly, 10, is depicted in FIG. 1 with connector 20 on first end 11 and connector 30 on second end 12. Cable 14 consists of a large number of fiberoptic filaments encased in flexible sheath 15 suitably made of silicone latex tubing. Connectors 20 and 30 are rigid so that there is a maximum of stress at the junctures between cable 14 and connectors 20 and 30. To relieve the stress at these junctures, stress-relieving sleeves 16 and 17 of molded silicone latex are provided, extending over portions of cable 14 and connectors 20 and 30.

Figure 2:
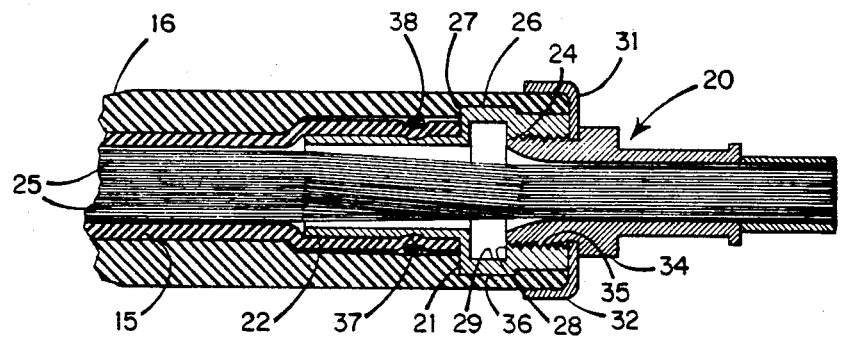
FIG. 2 is a cross-section of connector 20 in FIG. 1.
Figure 3:
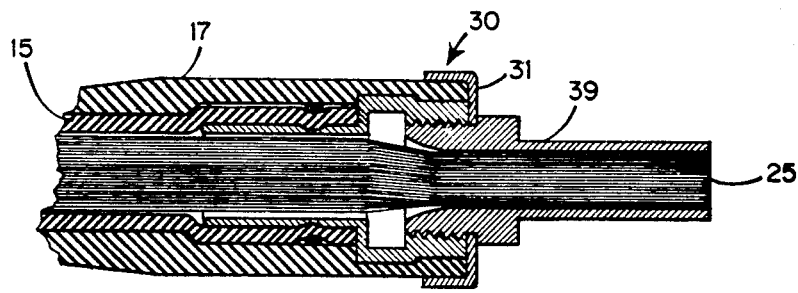
FIG. 3 is a cross-section of connector 30 in FIG. 1.

FIG. 2 shows a detail of connector 20 in cross section. Rigid cylindrical coupling element 21 has sleeve portion 22 enclosing multiple optical fibers 25. Element 21 is suitably molded or cast from metal or plastic. Flexible sheath 15 is stretched outward by sleeve portion 22 to extend over the exterior of sleeve 22. A second enlarged hollow portion 26 of element 21 adjoins portion 22. Enlarged hollow portion 26 has discontinuity 27 in the form of a raised annular ridge on its exterior surface. Other types of discontinuities may be utilized.

Inner surface 28 of second portion 26 has an annular recess 29 opposite discontinuity 27. Extending from recess 29 the surface 28 is threaded with screw threads 24.

Cup washer 31 fits over second portion 26 with its cupped surface facing toward cable 14. Strain relief 16 extends over the length of coupling element 21 and under the cupped portion 32 of washer 31. Locking element 34 has threaded portion 35 mating with screw threads 24. Threaded portion 35 clamps against washer 31 when element 34 is threaded into screw threads 24 in element 21. This in turn forces cup washer 31 to engagingly compress strain relief 16 against discontinuity 27. Preferably, strain relief 16 has molded annular recess 36 matching annular ridge 27 so that the compressive action of washer 31 produces a positive locking action locking strain relief 16 securely in place.

In order to ensure that moisture cannot enter sheath 15, it is also preferable to form annular recess 37 in sleeve portion 22. A tight O-ring, 2 turns of stainless wire 38 or other annular clamping means compresses sheath 15 into recess 37 making a water tight seal.

Connector 30 is similar to connector 20 except that locking element 34 is replaced with shorter locking element 39. The connectors used with the invention can be adapted to most equipment sockets by selection of the appropriate locking element.

In assembly, since no complex molding process is involved, the fiberoptic cable is cut to the desired length and coupling elements 21 are fitted over optical fibers 25. Sheath 15 is pushed on over the outside of sleeve portion 22 and clamped with wire 38. Strain relief 15 is pushed into position so that recess 36 engages annular ridge 27. Length of optical fibers 25 extending through coupling element 21 is saturated with epoxy or other suitable resin and then both washer 31 and locking element 34 are installed. After the epoxy has cured, the portion of fibers 25 extending beyond locking element 34 is removed and the remaining end is polished to a high finish. The second end of the cable is handled in a similar fashion.

Other types of discontinuities may be utilized to secure strain relief 16.

Figure 4:
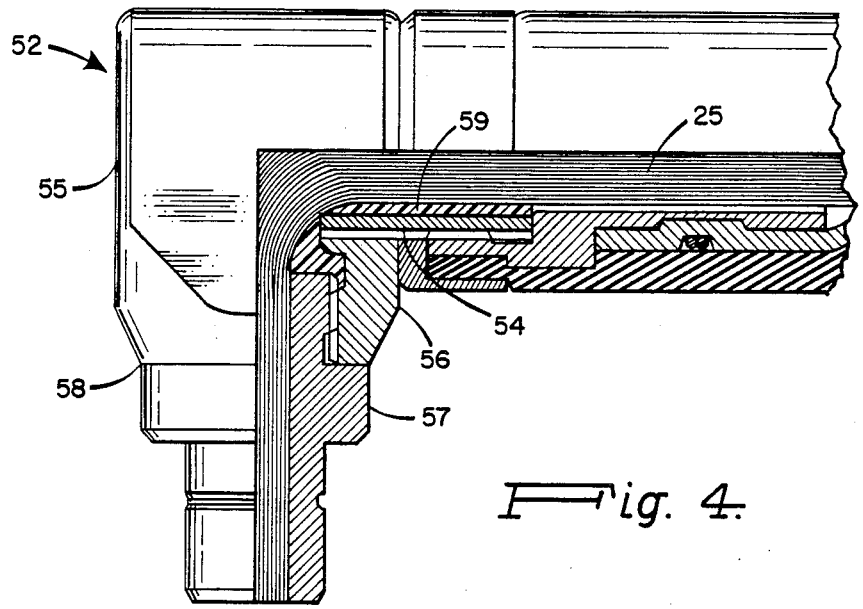
FIG. 4 is a front elevation partially in section of a connector with a right angle adapter.

Locking elements 34 and 39 provide a straight in line connecting axis. To provide an angled connecting axis, coupling adapter 52 is screwed to threaded portion 35 instead of locking element 34. As depicted in FIG. 4, adapter 52 is made in two parts, tubing 54 and elbow 55. Tubing 54 is a straight, externally threaded, length of tubing threaded into threaded portion 35. Elbow 55 is a 90° elbow internally threaded at both ends. First end 56 of elbow 55 is threaded onto tubing 54. Connecting element 57, similar to locking element 34, is threaded into second end 58 of elbow 55.

Figure 5:
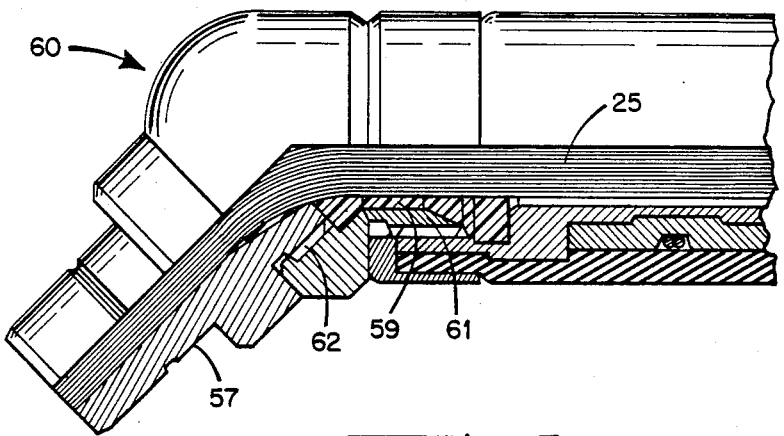
FIG. 5 is a front elevation partially in section of a connector with a 45° angle adapter.

Assembly is similar to that described previously except that length of optical fibers 25 extending through coupling element 21, now extends all the way through connecting element 57. Due to the sharp bend, it is preferable to use optical fibers with a diameter of 30 microns or less. FIGS. 4 and 5 are depicted at a scale of 4 to 1 and the radius of curvature of the fibers represented in FIG. 4 is actually about 7 mm. The fibers are saturated with epoxy or other suitable resin 59 all the way to and including annular recess 29. This ensures that the fibers are well anchored on both sides of the 90° bend preventing flexure at the bend itself. After the epoxy has cured, the portion of fibers 25 extending beyond connecting element 57 is removed and the remaining end is polished to a high finish.

While coupling adapter 52 has been described as made in two parts, it can readily be made as one integral piece in the form of a male/female elbow.

Angles other than 90° can be provided as depicted by 45° elbow 60 in FIG. 5. Elbow 60 has a first male end 61 that is externally threaded so as to mate with threaded portion 35. Second female end 62 of elbow 60 is internally threaded to receive connecting element 57. Assembly is the same as with the 90° elbow of FIG. 4.

Elbows 52 and 60 serve as the locking elements locking cupwasher 31 in place.

While the invention has been described with respect to specific embodiments, variations within the skill of the art are contemplated. Other angles less than 90° are readily provided and the components can be cast, molded or machined from various metals and plastics. It is not essential that the optical fibers be cemented together at the point of curvature within an elbow as long as they are cemented securely on both sides of the point of curvature so as to prevent flexure and possible breakage at the bend. Thus it is the intention to cover the invention as set forth in the following claims.

I claim:

1. A fiberoptic cable assembly having a length of multiple optical fibers, a flexible sheath enclosing said fibers and a connector at each end, with the connector at at least one end having the following combination:

a. a coupling element, enclosing the optical fibers, having a sleeve portion over which a sheath for the optical fibers is secured and an enlarged portion having internal coupling means;
    b. a coupling adapter secured to said coupling element by said internal coupling means and having a passage enclosing the optical fibers with said passage having an exit axis at an angle of up to 90° from the passage axis of said coupling element; and,
    c. a final connector element secured to said coupling adapter and within which said optical fibers are cemented together and polished to provide an input/output interface, said optical fibers being cemented firmly on both sides of said coupling adapter to prevent flexure within the coupling adapter and with the optical fibers cemented in a resinous cement from within said coupling element all the way through said connector element.

2. A fiberoptic cable assembly according to claim 1 wherein said coupling adapter is a 90° elbow.

3. A fiberoptic cable assembly according to claim 1 wherein said coupling adapter is a 45° elbow.

4. A fiberoptic cable assembly according to claim 1 further comprising a strain relief extending over said coupling element and secured by a cup washer wherein said internal coupling means is a screw thread and said coupling adapter is threaded into said screw thread so as to bear against said cup washer locking said cup washer into place against said strain relief.

5. A fiberoptic cable assembly having an angled connector comprising:

a. a fiber optic cable;
    b. a terminal assembly for said cable having a coupling element securing internal coupling means at its free end;
    c. a coupling adapter in the form of an elbow having a first end coupled to said internal coupling means and a second end;
    d. a connecting element for fiber optics coupled to said second end and supporting the finished end of a fiber optic bundle passing through said cable; and,
    e. cement securing said fiber optic bundle rigidly on both ends of said coupling adapter so as to prevent flexure of the fibers within said coupling adapter and with the optical fibers cemented in a resinous cement from within said coupling element all the way through said connecting element.

6. A fiberoptic cable assembly according to claim 5 wherein said coupling adapter is a 90° elbow.

7. A fiberoptic cable assembly according to claim 5 wherein said coupling adapter is a 45° elbow.

* * * * *